(12) United States Patent
Krishnamurthy et al.

(10) Patent No.: US 11,875,422 B2
(45) Date of Patent: Jan. 16, 2024

(54) BAGGAGE TRANSPORTATION USING AUTONOMOUS VEHICLE

(71) Applicant: Ford Global Technologies, LLC, Dearborn, MI (US)

(72) Inventors: Vivekananda Krishnamurthy, Dearborn, MI (US); Kathryn Hamilton, Dearborn, MI (US); Ray Siciak, Dearborn, MI (US); Mahrdad Damsaz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 16/770,782

(22) PCT Filed: Dec. 14, 2017

(86) PCT No.: PCT/US2017/066337
§ 371 (c)(1),
(2) Date: Jun. 8, 2020

(87) PCT Pub. No.: WO2019/117908
PCT Pub. Date: Jun. 20, 2019

(65) Prior Publication Data
US 2020/0394746 A1    Dec. 17, 2020

(51) Int. Cl.
*G06Q 50/30* (2012.01)
*G06F 16/24* (2019.01)
*G06V 20/56* (2022.01)

(52) U.S. Cl.
CPC ............. *G06Q 50/30* (2013.01); *G06F 16/24* (2019.01); *G06V 20/56* (2022.01)

(58) Field of Classification Search
CPC ......... G06Q 50/30; G06F 16/24; G06V 20/56
(Continued)

(56) References Cited

U.S. PATENT DOCUMENTS 5,265,006 A * 11/1993 Asthana ................. G06Q 10/08
705/7.22
2009/0276267 A1* 11/2009 Padan .................... G06Q 50/30
705/5
(Continued)

FOREIGN PATENT DOCUMENTS

DE          10033341 A1    1/2002

OTHER PUBLICATIONS

Evaluating the Economical and Environmental Impact of a Cargo Cycle Urban Distribution, Ormond, Jr., PQDT—Global ProQuest Dissertations Publishing (2017) (Year: 2017).*
(Continued)

*Primary Examiner* — Jeff Zimmerman
*Assistant Examiner* — Mark C Clare
(74) *Attorney, Agent, or Firm* — Brandon Hicks; Eversheds Sutherland (US) LLP

(57) ABSTRACT

Techniques and examples pertaining to baggage transportation in a vehicle-sharing environment are described. An automotive vehicle may have a plurality of baggage compartments each respectively having a size capacity and a weight capacity. The vehicle may also have a plurality of sensors capable of monitoring a loading situation of the plurality of baggage compartments. The vehicle may further have a memory element capable of storing capacity data representing the loading situation, as well as a processor capable of updating the capacity data in an event that the loading situation is changed due to a baggage having been loaded to, or unloaded from, a baggage compartment of the plurality of the baggage compartment. The automotive vehicle may be an autonomous ride-sharing vehicle.

11 Claims, 10 Drawing Sheets

(58) Field of Classification Search
USPC .......................................................... 705/13
See application file for complete search history.

(56) References Cited

U.S. PATENT DOCUMENTS

| | | | |
|---|---|---|---|
| 2015/0096813 A1* | 4/2015 | Aumente | ............... G01G 19/52 |
| | | | 177/245 |
| 2015/0323334 A1 | 11/2015 | Lord et al. | |
| 2017/0008644 A1* | 1/2017 | Dinkelmann | ............. B07C 5/04 |
| 2017/0083862 A1* | 3/2017 | Loubriel | ............ G06Q 10/0835 |
| 2017/0091891 A1 | 3/2017 | Van Der Berg | |
| 2017/0115125 A1* | 4/2017 | Outwater | ................ H04W 4/40 |
| 2017/0220966 A1* | 8/2017 | Wang | ...................... G06Q 20/12 |
| 2017/0364073 A1* | 12/2017 | Guy | ........................... B25J 9/00 |
| 2018/0232685 A1* | 8/2018 | Champ | ................ G06Q 10/083 |

OTHER PUBLICATIONS

International Search Report of the International Searching Authority for PCT/US2017/066337 dated Apr. 12, 2018.

\* cited by examiner

BAGGAGE TRANSPORTATION USING AUTONOMOUS VEHICLE

TECHNICAL FIELD

The present disclosure generally relates to automotive vehicles and, more particularly, to transporting baggage using an autonomous vehicle.

BACKGROUND

Transportation of baggage, whether with or without passenger(s) who travel along, is a vast demand in daily life and thus holds significant monetary potential. Wide-scale production of autonomous vehicles create new possibilities in mobility and transportation services. A commonly assumed vehicle-sharing (e.g., ride-sharing) service model uses a fleet of operator-owned vehicles made available to customers who require transportation. Autonomous vehicles provide a viable option to package and baggage delivery systems. The possibilities to capitalize on transportation services are numerous.

An important consideration in fulfilling the demand of baggage transportation for using mobility solution networks resides in ensuring baggage to comply with weight, size, and content safety standards. Furthermore, an automated optimization policy or algorithm that balances space efficiency with service availability allows autonomous transportation systems to exceed the proficiency of traditional delivery systems including driver-operated transportation vehicles. Therefore, a baggage transportation system to identify, measure, accept, process, secure, and unload baggage from a customer for transportation in an autonomous vehicle is needed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

As mentioned above, a purpose of the present application is to propose a baggage transportation system that is able to identify, measure, accept, process, secure, and unload baggage from a customer for transportation. The transportation may be carried out using a traditional driver-operated vehicle such as a car, a van, a cargo truck, or a bus. In some embodiments, on the other hand, an autonomous vehicle may also be used to perform the transportation. The transportation service may be provided in a vehicle-sharing manner. That is, various baggage, parcels, or even passengers that have trips starting from different origins and/or arriving at different destinations may share a vehicle for at least a portion of their respective trips. The proposed baggage transportation system for vehicle-sharing services may generally exhibit the following capabilities: (1) allow a customer to enter or input baggage information; (2) allow the vehicle service provider to assess baggage information entered and provide an appropriate vehicle to accommodate the baggage; (3) allow the vehicle to verify baggage information and accept the baggage at trip origin; (4) allow the customer to load and secure his or her baggage; and (5) allow the customer or a recipient of the baggage to unsecure and unload the baggage at the trip destination. Various embodiments of the proposed baggage transportation system may be implemented in example scenarios such as those depicted in FIG. 1 and FIG. 2, as described below.

Figure 1:
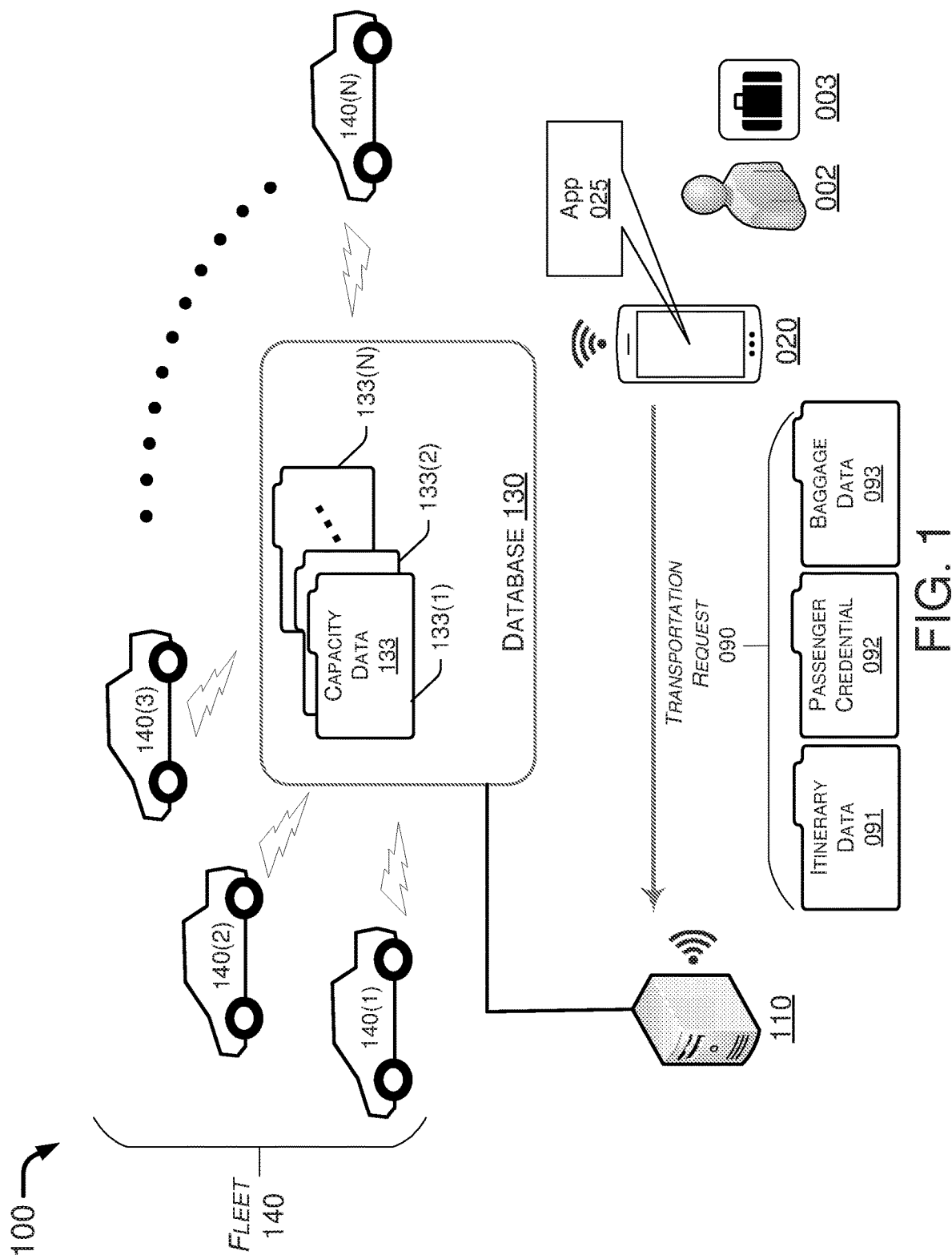
FIG. 1 is a diagram depicting an example scenario in which embodiments in accordance with the present disclosure may be utilized.

FIG. 1 depicts an example scenario 100 in which embodiments of the proposed baggage transportation system may be implemented. Passenger 002 and/or baggage 003 may need to be transported from a pickup location to a destination. To set up a transportation service with a service provider to fulfill this transportation need, a transportation request 090 may be initiated from a computer or a computing device such as smartphone 020 of FIG. 1 (e.g., by a user such as passenger 002). Transportation request 090 may include information needed for the service provider to perceive various aspects of the transportation need. For example, transportation request 090 may include itinerary data 091, which may contain information regarding the pickup location and the destination and other itinerary-related information such as a name or an address of the pickup location, a name or an address of the destination, a time by when passenger 002 and/or baggage 003 need to arrive at the destination, a time window during which passenger 002 and/or baggage 003 may be picked up at the pickup location, and the like. Transportation request 090 may also include passenger credential 092, which may contain information regarding passenger 002 such as a name of passenger 002, a gender of passenger 002, an image or a picture of passenger 002, a phone number at which passenger 002 may be reached, and the like. Transportation request 090 may further include baggage data 093, which may contain information regarding baggage 003 such as information relevant to a size of baggage 003, information relevant to a weight of baggage 003, a color of baggage 003, whether baggage 003 is hard-shelled (e.g., a luggage case) or soft-covered (e.g., a duffel bag), whether baggage 003 is to be transported with an accompanying passenger (e.g., passenger 003) or alone without an accompanying passenger, and the like. Baggage data 093 may also include a specific orientation in which baggage 003 needs to be transported. For example, a baggage containing a bottle of liquid may only be transported with the bottle maintained in an upright position.

Figure 3:
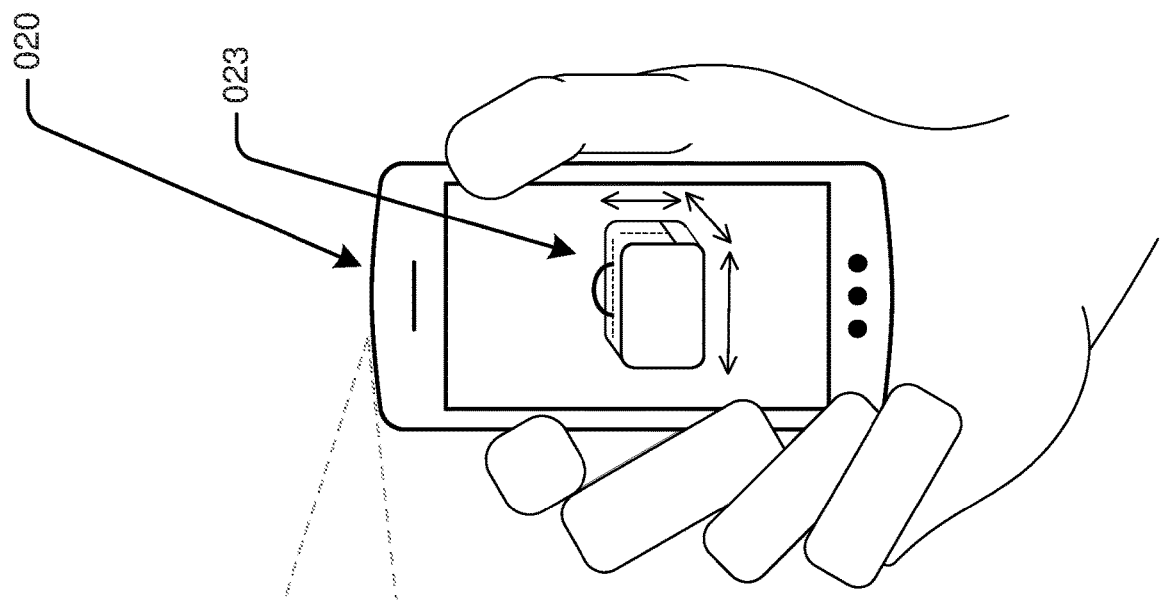
FIG. 3 is a diagram depicting a smartphone capturing an image of baggage in accordance with an embodiment of the present disclosure.
Figure 3:
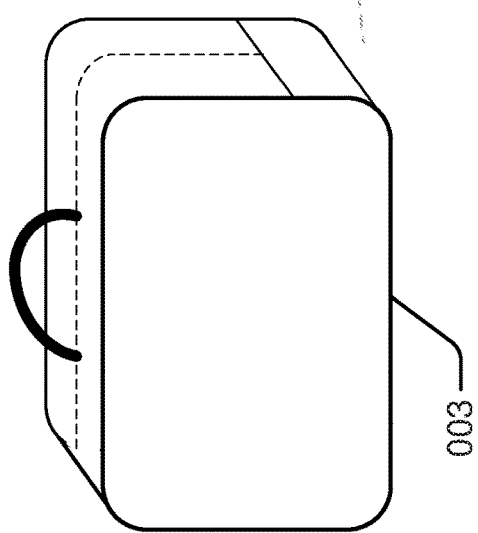

The information relevant to the weight of baggage 003 may be an estimated or measured weight of baggage 003, whereas the information relevant to the size of baggage 003 may be an estimated or measured dimension (e.g., width, length and height) of baggage 003. In some embodiments, the information relevant to the size of baggage 003 may be a photograph or an image 023 of baggage 003, which may be taken by a camera disposed on smartphone 020, as shown in FIG. 3. The image of baggage 003 may be analyzed by a computer or computing system 110, by which transportation request 090 is received, to result in the estimated dimension of baggage 003.

In an event that baggage 003 is to be transported without an accompanying passenger, baggage data 093 may also include a credential of a recipient who is expected to receive baggage 003 at the destination. The credential of the recipient may include a name of the recipient, a gender of the recipient, an image or a picture of the recipient, a phone number at which the recipient may be reached, and the like. The credential of the recipient may be saved in, or remembered by, computing system 110 for verifying an identity of the recipient upon the recipient arrives at the destination to receive baggage 003, as described further in a later part of the present application.

All data of transportation request 090, including itinerary data 091, passenger credential 092 and baggage data 093, may be entered or otherwise collected using a software or a programmed interface, such as app 025 installed on smartphone 020. Via app 025, a user may also command smartphone 020 to transmit transportation request 090 to computing system 110 when all necessary content of transportation request 090 has been entered or collected.

The transportation service to fulfill transportation request 090 may be provided by a vehicle of fleet 140 shown in FIG. 1. Fleet 140 may have one or more vehicles, such as vehicles 140(1), 140(2), 140(3), . . . , 140(N), which in some embodiments may be an autonomous vehicle. Each of vehicles 140(1), 140(2), 140(3), . . . , 140(N) may have one or more baggage compartments capable of storing baggage, as well as one or more seats for passengers. One vehicle of fleet 140 may be used to perform the transportation service that fulfills transportation request 090. Each baggage compartment may have a size capacity and a weight capacity, and may be able to carry baggage that does not exceed the size capacity and the weight capacity. For example, baggage 003 of FIG. 1 may have a size of 4 feet in length, 3 feet in width and 1 foot in height, and a weight of 50 pounds. Therefore, any vehicle of fleet 140 that has an empty baggage compartment of a size capacity equal to or larger than 4 ft×3 ft×1 ft and a weight capacity equal to or larger than 50 lbs may be used to perform the transportation service that fulfills transportation request 090.

Computing system 110 of FIG. 1 may be a centralized server or computer that receives transportation request 090, and may access a centralized database 130 that stores information regarding the fleet of vehicles 140. In particular, database 130 may store capacity data 133 of fleet of vehicles 140. Capacity data 133 represents, records or otherwise keeps track of a loading situation of the one or more baggage compartments of each vehicle of fleet 140. For example, as shown in FIG. 1, capacity data 133 stored in database 130 may include capacity data 133(1), 133(2), . . . , 133(N) for tracking loading situation of baggage compartments of vehicle 140(1), 140(2), . . . , 140(N), respectively. That is, capacity data 133(1) may track a loading situation of vehicle 140(1), capacity data 133(2) may track a loading situation of vehicle 140(2), . . . , and capacity data 133(N) may track a loading situation of vehicle 140(N). By accessing database 130, computing system 110 may be informed of the size capacity and the weight capacity of each baggage compartment of each vehicle of fleet 140. By accessing database 130, computing system 110 may also be able to determine, out of vehicles 140(1)-140(N) of fleet 140, which vehicles may have a baggage compartment that is available to accommodate baggage 003. Namely, based on transportation request 090 received from smartphone 020 and capacity data 133 stored in database 130, computing system 110 may be able to select a vehicle of fleet 140 to perform the transportation service that fulfills transportation request 090.

Each of vehicles 140(1)-140(N) of fleet 140 may be communicatively coupled to database 130 when in operation, via a communication module on the respective vehicle, regardless whether the respective vehicle is moving or not. Therefore, each vehicle of fleet 140 may be capable of updating its respective one of capacity data 133(1), 133(2), . . . , 133(N) in a real-time manner. As a result, computer system 110 can always have access to the most updated loading situation of each vehicle of fleet 140 to select a vehicle for fulfilling a new transportation request received by computer system 110.

Figure 2:
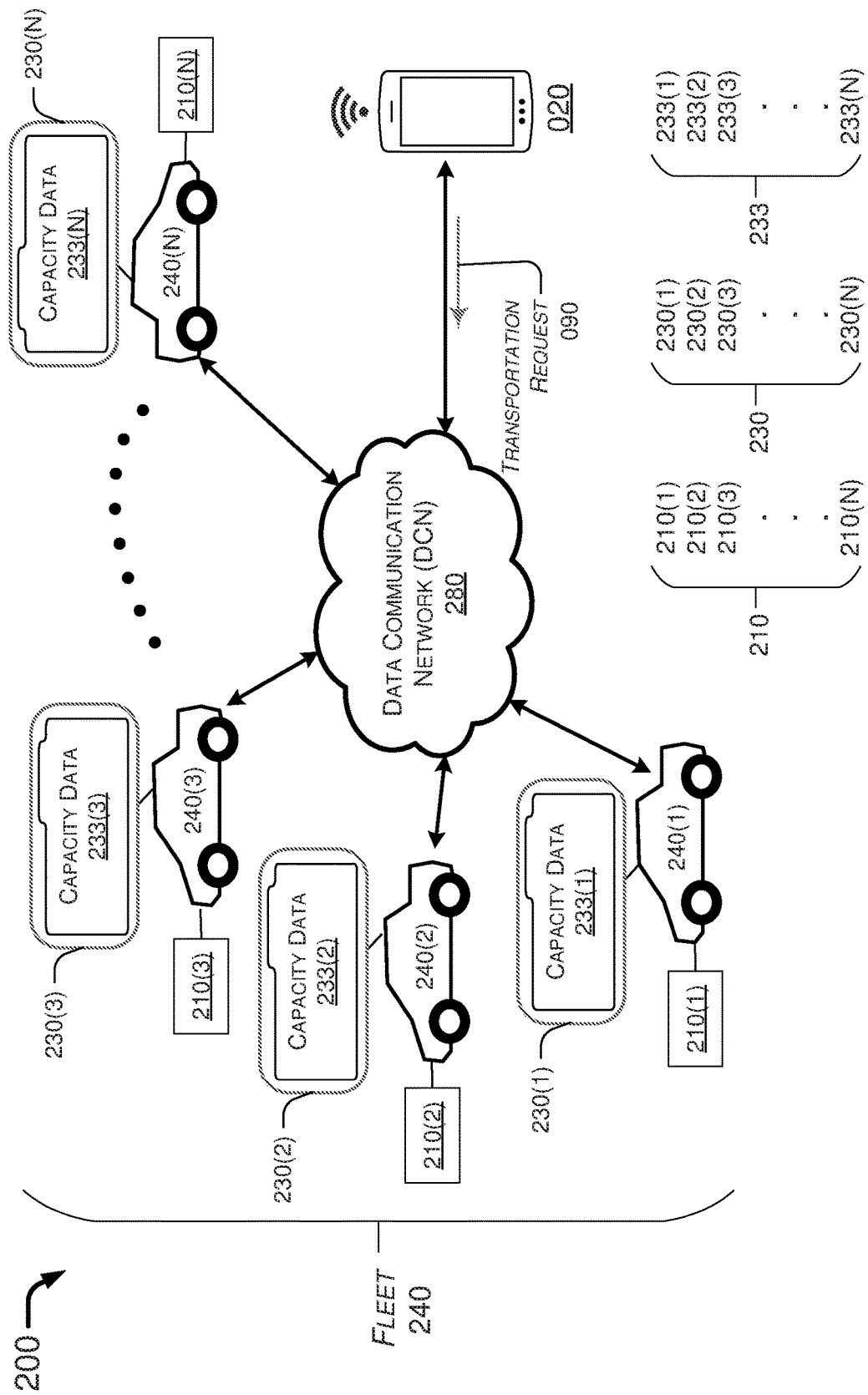
FIG. 2 is a diagram depicting another example scenario in which embodiments in accordance with the present disclosure may be utilized.

FIG. 2 depicts another example scenario 200 in which embodiments of the proposed baggage transportation system may be implemented. Similar to scenario 100, transportation request 090 is also initiated by a computer or a computing device such as smartphone 020 of FIG. 2. A major difference between the baggage transportation system of FIG. 2 and the baggage transportation system of FIG. 1 resides in the receiving end of transportation request 090. In scenario 200, computing system 210 on the receiving end of transportation request 090 may be composed of a network of distributed processors 210(1), 210(2), 210(3), . . . , 210(N). Each of distributed processors 210(1), 210(2), 210(3), . . . , 210(N) may be disposed in a respective vehicle of fleet of vehicles 240 that includes vehicles 240(1), 240(2), 240(3), . . . , 240(N). That is, rather than being received by a centralized server such as computing system 110 of FIG. 1, transportation request 090 of scenario 200 of FIG. 2 may be broadcasted to each of vehicles 240(1), 240(2), 240(3), . . . , 240(N) and received by the respective one of distributed processors 210(1), 210(2), 210(3), . . . , 210(N) disposed in the respective vehicle. Each of distributed processors 210(1), 210(2), 210(3), . . . , 210(N) may be communicatively coupled to each other and to smartphone 020 via a data communication network (DCN) 280.

Another major difference between the baggage transportation system of FIG. 2 and the baggage transportation system of FIG. 1 resides in where capacity data 233 of fleet 240 is stored. In scenario 200, database 230 which stores capacity data 233 may be composed of a network of memory elements 230(1), 230(2), 230(3), . . . , 230(N). As illustrated in FIG. 2, each of memory elements 230(1), 230(2), 230(3), . . . , 230(N) may be disposed in a respective vehicle of fleet 240. That is, rather than being stored in a centralized database such as database 130 of FIG. 1, capacity data 233 may be stored in distributed database 230 that has memory elements 230(1), 230(2), 230(3), . . . , 230(N) physically located in various vehicles of fleet 240. In particular, memory element 230(1) may be disposed in vehicle 240(1), and capacity data 233(1) that records one or more baggage compartments of vehicle 240(1) may be stored in memory element 230(1). Similarly, memory element 230(2) may be disposed in vehicle 240(2), and capacity data 233(2) that records one or more baggage compartments of vehicle 240(2) may be stored in memory element 230(1). The same thing can be said for the rest of capacity data 233(3) 233(N) and the rest of memory elements 230(3)-230(N).

Other aspects of the baggage transportation system of FIG. 2 are similar to those of the baggage transportation system of FIG. 1. For example, each of vehicles 240(1)-240(N) may be capable of updating, in a real-time manner, the respective one of capacity data 233(1)-233(N) stored in memory elements 230(1)-230(N), respectively. Consequently, distributed processors 210(1)-210(N) may always have access to the most updated loading situation of each vehicle of fleet 240 to collectively select a vehicle out of fleet 240 for fulfilling transportation request 090. That is, by accessing memory elements 230(1)-230(N), distributed processors 210(1)-210(N) may know the size capacity and the weight capacity of each baggage compartment of each vehicle of fleet 240, respectively. With the aid of DCN 280, distributed processors 210(1)-210(N) may also know, out of vehicle 240(1)-240(N) of fleet 240, which vehicles may have a baggage compartment that is available to accommodate the baggage described in transportation request 090. Namely, by comparing transportation request 090 received from smartphone 020 with capacity data 233 stored in database 230, computing system 210 may be able to select a vehicle of fleet 240 to perform the transportation service that fulfills transportation request 090.

The baggage transportation system of FIG. 2 may have at least the following advantages as compared to the baggage transportation system of FIG. 1 due to the feature that each vehicle of fleet 240 has a respective one of memory elements 230(1)-230(N) and a respective one of distributed processors 240(1)-240(N) disposed thereon: (1) the update of the capacity data for each vehicle is more prompt, or more "real time"; (2) the response time to select the vehicle to fulfill the transportation request is shorter; (3) the system is more robust and would not stop functioning in an event that some of the distributed processors 210(1)-210(N) are not working; and (4) a physical location of each vehicle of the fleet may be readily available (e.g., through a global positioning system disposed on the vehicle) to the system, enabling a fleet-wide optimization of service routing that improves service efficiency of the system as a whole.

Figure 4:
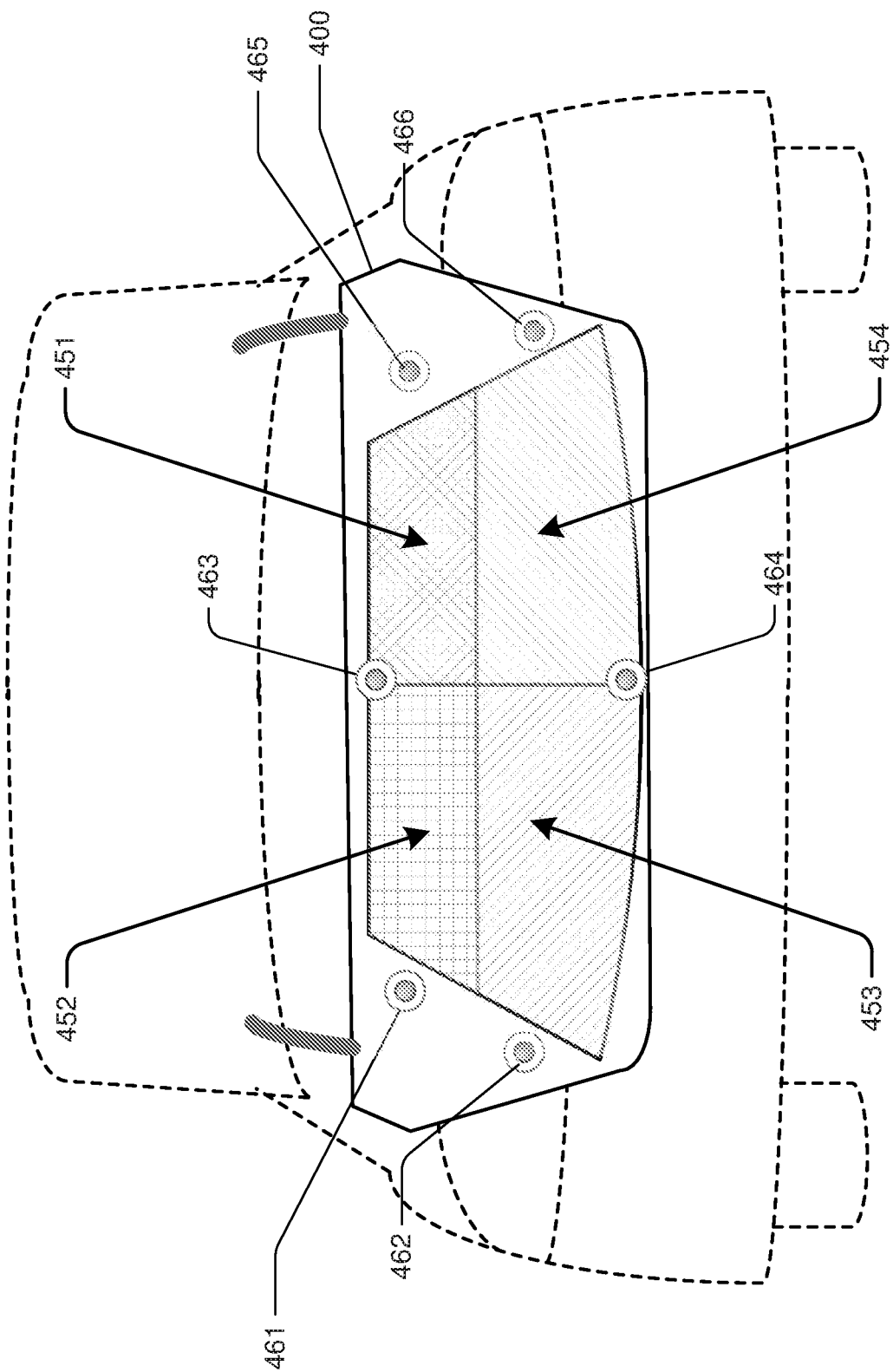
FIG. 4 is a diagram depicting baggage compartments in accordance with an embodiment of the present disclosure.

FIG. 4 illustrates an example baggage space 400 of a vehicle of fleet 140 of FIG. 1 or fleet 240 or FIG. 2. As shown in FIG. 4, baggage space 400 may be divided into four baggage compartments, 451, 452, 453 and 454. As mentioned above, each of baggage compartments 451, 452, 453 and 454 may have a size capacity and a weight capacity. An empty baggage compartment may accommodate a baggage that does not exceed the size capacity and the weight capacity of that particular baggage compartment. A plurality of sensors, such as sensors 461, 462, 463, 464, 465 and 466 of FIG. 4, may be disposed around baggage space 400 to monitor a loading situation of baggage compartments 451-454. That is, sensors 461-466 of FIG. 4 may be used to monitor which baggage compartment(s) of baggage compartments 451-454 may already been occupied by a baggage. Furthermore, in an event that a baggage is loaded to, or unloaded from, any of baggage compartments 451-454, sensors 461-466 may be able to detect a change of the loading situation, and a corresponding capacity data (such as one of capacity data 133(1)-133(N) or capacity data 233(1)-233(N)) may be readily updated by a processor or a computer (such as central server 110 of FIG. 1 or one of distributed processors 210(1)-210(N) of FIG. 2) to reflect the change of the loading situation of the vehicle. Various types of sensors may be employed for this purpose. For example, sensors 461-466 may include a pressure sensor, a proximity sensor, a light detector, a visible light camera or an infrared camera. In some embodiments, sensors 461-466 may include a weight scale embedded at the bottom of a baggage compartment. In addition to monitoring the loading situation of the baggage compartment, the weight scale may also provide a direct measurement of the weight of a baggage carried by the baggage compartment.

The division of baggage space 400 into baggage compartments 451-454 may be carried out either physically or virtually. In some embodiments, actual dividers may be used for the division of baggage space 400. In some embodiments, on the other hand, baggage space 400 may be virtually divided into a few baggage compartments without using actual dividers to separate the baggage compartments from each other. A virtually divided baggage space 400 may exhibit a benefit of a flexibility to dynamically adjust the size capacity and/or weight capacity of each of baggage compartments 451-454. The flexibility may enable actions such as dividing an existing baggage compartment into two or more baggage compartments, or merging two or more empty baggage compartments into a larger baggage compartment, thereby increasing an efficiency of utilization of baggage space 400.

Figure 5:
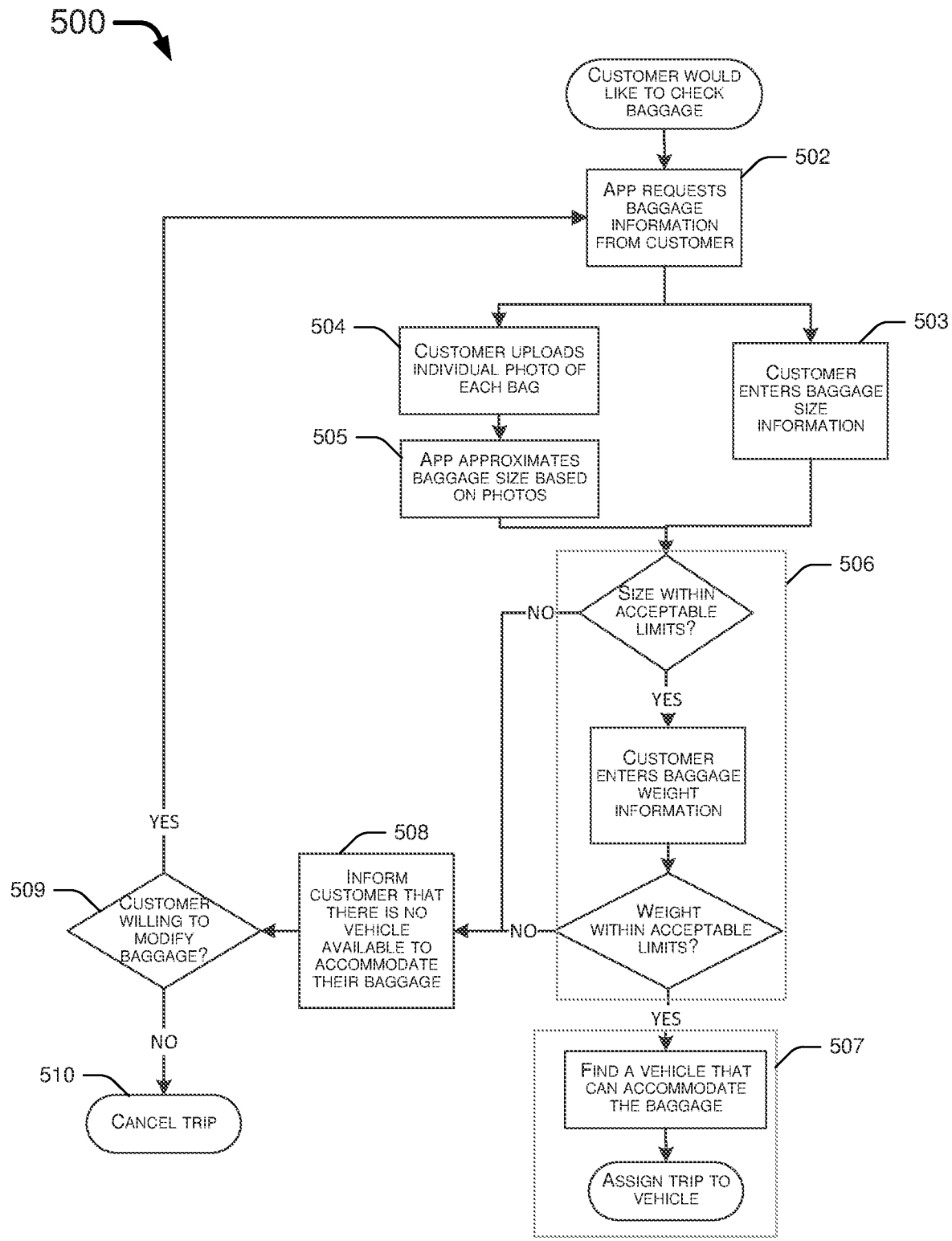
FIG. 5 is a flowchart depicting an example process of acknowledging a transportation request in accordance with an embodiment of the present disclosure.
Figure 6:
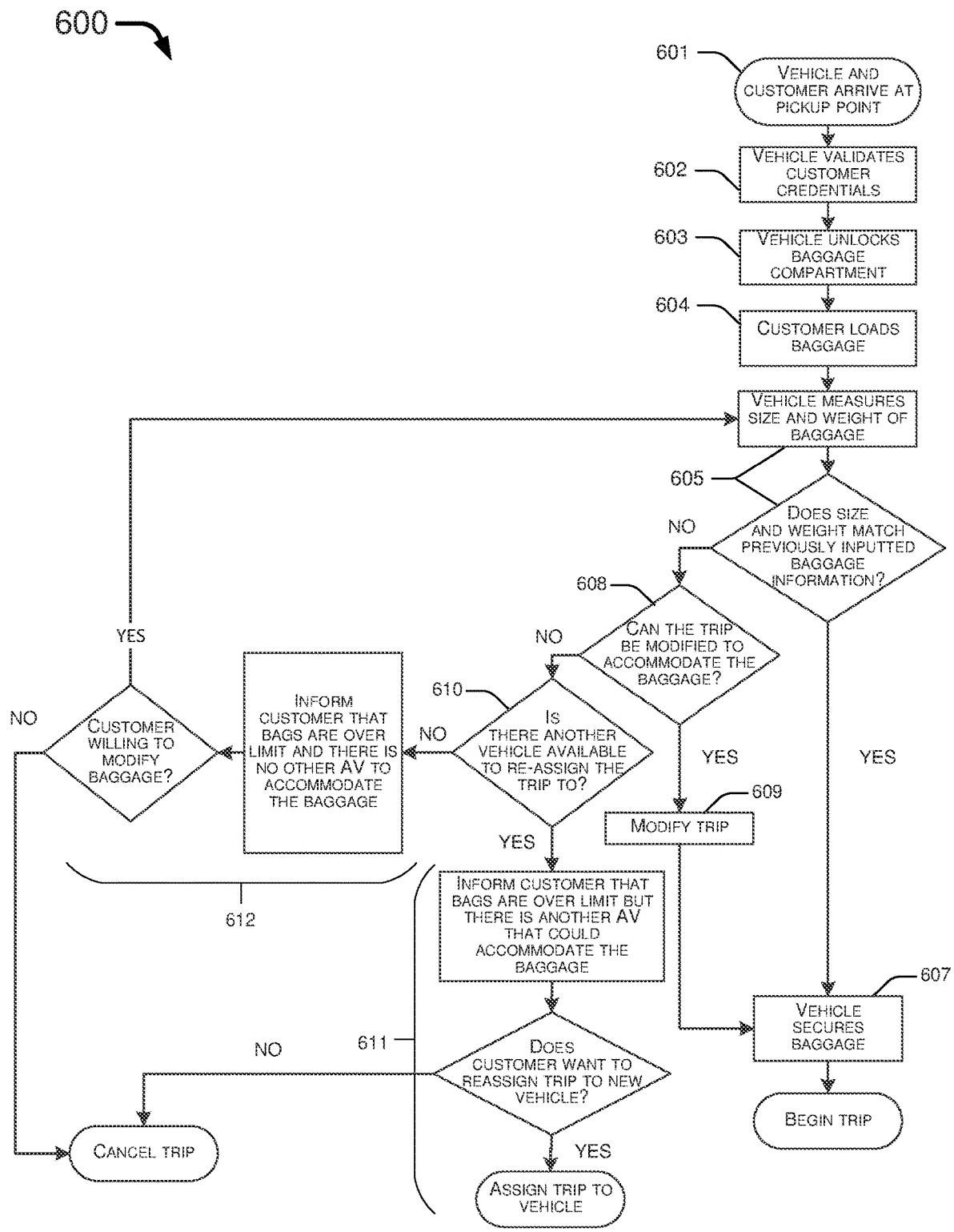
FIG. 6 is a flowchart depicting an example process of picking up the baggage at the pickup location in accordance with an embodiment of the present disclosure.
Figure 8:
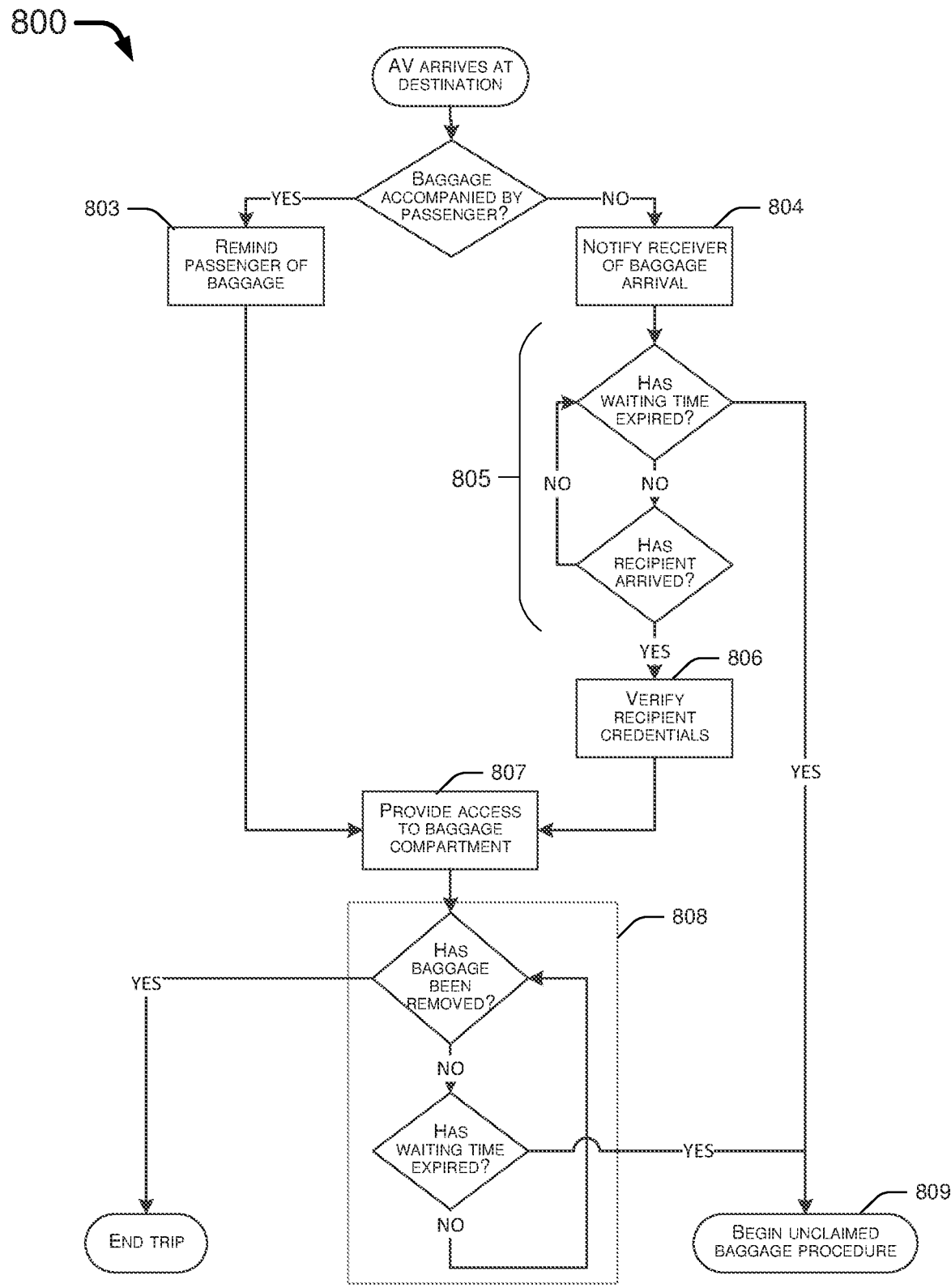
FIG. 8 is a flowchart depicting an example process of delivering the baggage at the destination in accordance with an embodiment of the present disclosure.

FIGS. 5, 6 and 8 each depicts a segment of a baggage transportation service process that may be used in scenarios 100 of FIG. 1 and 200 of FIG. 2. FIG. 5 shows a flowchart of a first segment of the baggage transportation service process, depicting an example process 500 for acknowledging a transportation request (e.g., transportation request 090 of FIG. 1 or FIG. 2) that may be fulfilled by one or more vehicles of a fleet of vehicles operated by a service provider. Once a customer indicates to the service provider that a baggage (e.g., baggage 030 of FIG. 1) needs to be transported from a pickup location to a destination, the customer is required to provide baggage information such as size and weight to the service provider. At 502 of process 500, baggage information (e.g., baggage data 093 of FIG. 1) may be entered by the customer using a mobile phone application (e.g., app 025 of FIG. 1) or other computerized information entry system executed by a processor or on a computing device (e.g., smartphone 020 of FIG. 1 and FIG. 2). As described above, an estimated size of the baggage maybe provided by the customer entering the dimensions of the baggage (i.e., 503 of process 500), or by uploading an image of the baggage to the service provider (i.e., 504 of process 500). A computing system of the service provider (e.g., central server 110 of FIG. 1 or distributed processors 210 of FIG. 2) may have a visual sizing capability to analyze the uploaded image and computer vision algorithms to approximate the dimensions of the baggage (i.e., 505 of process 500).

At 506 of process 500, once the baggage information (including the baggage size and weight) has been entered by the customer and subsequently received by the computing system of the service provider, the computing system may determine if the baggage size and weight are within acceptable limits. That is, the computing system may determine whether the baggage size and weight can be accommodated in an available baggage compartment of a fleet vehicle (e.g., any of vehicles 140(1)-140(N) of FIG. 1 or 240(1)-240(N) of FIG. 2). As described above, to achieve this, the computing system may access a database (e.g., centralized database 130 of FIG. 1 or distributed database 230 of FIG. 2) that keeps track of capacity data (e.g., capacity data 133 of FIG. 1 or 233 of FIG. 2) of the fleet of vehicles. In an event that the computing system of the service provider determines that at least one baggage compartment of the fleet of vehicles is available to accommodate the baggage, the computing system may further select a vehicle of the fleet that has at least one such available baggage compartment and assign a task to the vehicle to fulfill the transportation request with such an available baggage compartment (i.e., 507 of process 500).

In an event that the computing system of the service provider determines that baggage size or weight is not within acceptable limits based on the capacity data of the fleet of vehicles, the customer may be informed that there is currently no vehicle available to accommodate the baggage (i.e., 508 of process 500). The customer then has the option of modifying the baggage (e.g., repackaging the baggage into multiple smaller and/or lighter packages) and beginning the baggage acceptance process again (i.e., 509 of process 500), or cancelling the trip (510 of process 500).

FIG. 6 shows a flowchart depicting an example process 600 of the baggage transportation system for picking up the baggage at the pickup location. Process 600 may follow process 500 of FIG. 5 as a second segment of the baggage transportation service process. Once the vehicle (as determined in 507 of process 500) and the customer both arrive at the pickup location (i.e. 601 of process 600), the baggage size and weight may be validated to ensure the baggage size and weight match the baggage information (e.g., baggage data 093 of FIG. 1) provided by the customer during the transportation request process (i.e., process 500 of FIG. 5). In particular, the vehicle may validate the customer's credentials (i.e., 602 of process 600) and subsequently provide the customer access to a baggage compartment of the vehicle (i.e., 603 of process 600) for the customer to load the baggage to the baggage compartment (i.e., 604 of process 600). The baggage compartment, such as one of baggage compartments 451, 452, 453 and 454 as shown in FIG. 4, is intended by the baggage transportation system to accommodate the baggage, as determined in 506 and 507 of process 500.

Figure 7:
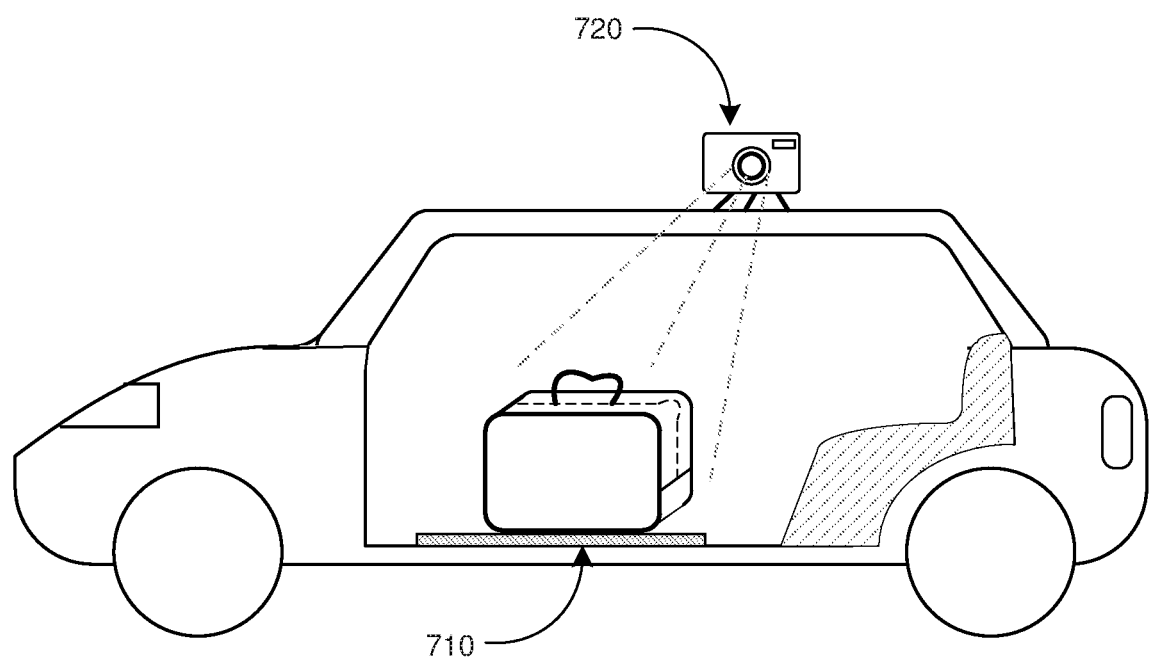
FIG. 7 is a diagram depicting verification of baggage size and weight in accordance with an embodiment of the present disclosure.

Subsequently, at 605 of process 600, the vehicle may measure or estimate the size and weight of the baggage using one or more baggage measuring devices, and determine whether or not the baggage is close in size and weight to the baggage size and weight information received during the transportation request process (i.e., the baggage size information entered at 503 of process 500, the baggage size estimated at 505 of process 500, and/or baggage weight information entered at 506 of process 500). The one or more baggage measuring devices used at 605 of process 600 may include a weight scale (e.g., weight scale 710 as shown in FIG. 7), and the weight of the baggage may be measured by the weight scale. The weight scale may be disposed directly in the baggage compartment intended for receiving the baggage. Alternatively, the weight scale may be disposed in a designated weighing area of the vehicle. The one or more baggage measuring devices used at 605 of process 600 may also include a three-dimensional (3D) scanner and/or a camera, and the size of the baggage may be directly measured with the 3D scanner performing a 3D scan of the baggage, or estimated by the vehicle based on an image of the baggage taken by the camera. The 3D scanner and/or the camera may be disposed on the vehicle at a location suitable for performing the 3D scan or taking the image, respectively, of the baggage. For example, the camera or the 3D scanner may be disposed on the roof of the vehicle, such as camera or 3D scanner 720 shown in FIG. 7. In some embodiments, the weight scale and the 3D scanner or the camera may be integrated as one baggage measuring device, and both the size and the weight of the baggage may be simultaneously measured by the baggage measuring device. In some embodiments, the integrated baggage measuring device may be disposed at a designated baggage measuring area for measuring each baggage intended to be loaded into the vehicle. In some embodiments, the baggage compartment may not unlock until the size/weight of the baggage are verified to be within a predetermined size/weight tolerance from the baggage size/weight received during process 500. The predetermined size/weight tolerance may have either or both of a positive value and a negative value. The size tolerance and the weight tolerance may be negative lest the baggage may exceed the size capacity or weight capacity of the baggage compartment. The size tolerance and the weight tolerance may be positive to ensure a larger baggage compartment is not wasted on receiving a baggage that weighs or sizes far less than the weight or size capacity of the baggage compartment.

In an event that the size and the weight of the baggage are verified to match or be within the predetermined tolerance from the baggage size and weight received during the transportation request process (i.e., process 500), the vehicle may, at 607 of process 600, secure the baggage after the baggage has been loaded to the baggage compartment intended for receiving the baggage. In an event that either the size or the weight of the baggage is not within the predetermined tolerance from the baggage size or weight received during the transportation request process, the service provider may be notified by the vehicle. For example, the vehicle may notify computing system 110 of FIG. 1, or part or all of computing system 210 of FIG. 2, that the baggage exceeds the size or weight capacity of the baggage compartment. Computing system 110 or 210 may, at 608 of process 600, update baggage data 093 with the size and weight measured by the baggage measuring devices on the vehicle, and seek to accommodate the baggage using another baggage compartment of the vehicle, or of another vehicle of the fleet. For example, computing system 110 or 210 may access database 130 or 230 to see if the vehicle has another baggage compartment, likely of a higher weight or size capacity, that may accommodate the baggage. If, despite the size and weight of the baggage being different than expected, computing system 110 or 210 determines that the vehicle does have another baggage compartment available to accommodate the baggage, process 600 may proceed to 609 to modify the trip and assign the task to the same vehicle but using a new baggage compartment thereof, assess a new transportation fee, and make other necessary changes to update the trip. It is worth noting that a currently empty baggage compartment is not necessarily an available baggage compartment, especially in a vehicle-sharing environment, as the currently empty baggage compartment may have already been scheduled to receive another baggage at a different location later in the trip. Process 600 may then proceed from 609 to 607.

In an event that, at 608 of process 600, it is determined that the current vehicle does not have another baggage compartment available for the baggage, process 600 may proceed to 610. At 610, the baggage transportation system may determine whether an arrangement may be made to have another vehicle of the fleet come to the pickup location to pick up the baggage. For example, computing system 110 or 210 may access database 130 or 230 to determine if there is another vehicle in the fleet that is available for fulfilling the transportation request. In an event that another vehicle of the fleet is available, process 600 may proceed from 610 to 611 to inform the customer and ask if the customer agrees to modify the current trip request such that it is to be fulfilled by another vehicle. If the customer agrees, the service provider may assign the trip to the new vehicle and process 600 may start over from 601 with the new vehicle.

In an event that, at 610 of process 600, it is determined that another vehicle of the fleet is not available, process 600 may proceed from 610 to 612 to inform the customer that the baggage is larger or heavier than expected but there is currently no other vehicles that can go and pick up the baggage. Also at 612, process 600 may involve presenting to the customer an option to modify the baggage into smaller and/or lighter packages that may be accommodated by the fleet of vehicle. For example, computing system 110 or 210 may send a repackaging suggestion to smartphone 020, with the repackaging suggestion including one or more suggested ways to repackage the baggage into a few smaller and/or lighter packages. The customer may decide whether he or she is willing to modify the baggage accordingly. In an event that the customer is willing to repackage, process 600 may end and the baggage transportation service process may start over from the first segment (i.e., process 500 of FIG. 5) with smartphone 020 sending to computing system 110 or 210 a new transportation request 090 having a modified baggage data 093. In an event that the customer is not willing to repackage, the transportation request is canceled.

FIG. 8 shows a flowchart depicting an example process 800 of the baggage transportation system for delivering or offloading the baggage at the destination. Process 800 may follow process 600 of FIG. 6 as a third segment of the baggage transportation service process. Upon arrival at the destination with the baggage, the vehicle (which may be an autonomous vehicle, or "AV") must make sure the baggage is properly offloaded. As mentioned above, the baggage may or may not be accompanied by a passenger. If the baggage is accompanied by a passenger, the vehicle may, at 803 of process 800, remind the passenger of the baggage and, at 807 of process 800, provide the passenger access to the baggage compartment. The vehicle may, at 808 of process 800, wait a predetermined amount of waiting time for the baggage to be removed. If the baggage is removed within the predetermined amount of waiting time, the trip may end. If the baggage is not removed before the waiting time expires, the vehicle may, at 809 of process 800, notify the service provider (i.e., computing system 110 of FIG. 1 or computing system 210 of FIG. 2) that baggage is unclaimed, and the service provider may respond appropriately and begin an unclaimed baggage process.

If the baggage is not accompanied by a passenger, the vehicle or the service provider (e.g., computing system 110 of FIG. 1 or computing system 210 of FIG. 2) may, at 804 of process 800, send a notification to a recipient of the package (as specified in baggage data 093 of FIG. 1) indicating that the baggage has arrived at the destination. The vehicle may, at 805 of process 800, wait for a predetermined amount of waiting time for the receiver to arrive. If the recipient does not present at the destination with the waiting time, process 800 may proceed from 805 to 809. The vehicle may, at 809 of process 800, notify the service provider (i.e., computing system 110 of FIG. 1 or computing system 210 of FIG. 2) that baggage is unclaimed, and the service provider may respond appropriately and begin an unclaimed baggage process. In an event that the recipient arrives at the destination within the waiting time, the vehicle may, at 806 of process 800, verify recipient's credential by receiving a verification of credentials of the recipient such as an identification card of the recipient or a confirmation number of the transportation request. With the credential of the recipient verified, process 800 may proceed from 806 to 807. At 807, the vehicle may grant or otherwise provide an access to the baggage (e.g., by unlocking the baggage compartment containing the baggage) for the recipient to unload the baggage from the vehicle. Process may proceed from 807 to 808.

Figure 9:
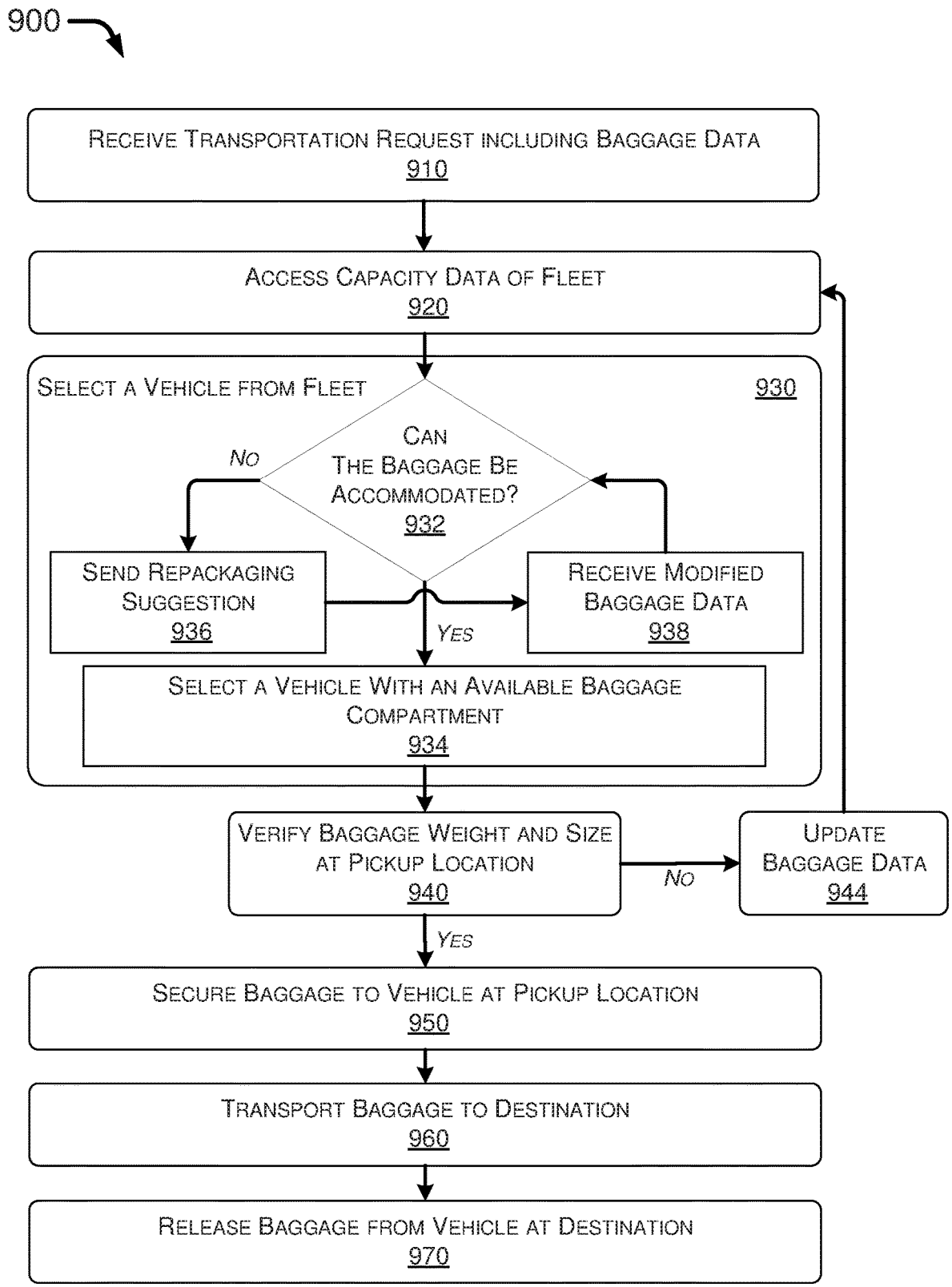
FIG. 9 is a flowchart depicting an example baggage transportation process in accordance with an embodiment of the present disclosure.

FIG. 9 illustrates another example process 900 for providing baggage and passenger transportation service using a fleet of share-riding vehicles. The fleet of share-riding vehicles may include driver-operated vehicles, autonomous vehicles, or a combination of both. Process 900 may include one or more operations, actions, or functions shown as blocks such as 910, 920, 930, 940, 950, 960 and 970 of FIG. 9. Although illustrated as discrete blocks, various blocks of process 900 may be divided into additional blocks, combined into fewer blocks, or eliminated, depending on the desired implementation. Process 900 may be implemented by a baggage transportation system operated in scenario 100 of FIG. 1 or scenario 200 of FIG. 2. Process 900 may begin with block 910.

At 910, process 900 may involve a first processor (e.g., computing system 110 or 210) receiving from a second processor (e.g., smartphone 020) a transportation request (e.g., transportation request 090). The transportation request may include itinerary data, passenger credential and/or baggage data (e.g., itinerary data 091, passenger credential 092 and/or baggage data 093 of FIG. 1) that are relevant to transporting a baggage, a passenger, or both, from a pickup location to a destination. The itinerary data may include information relevant to the pickup location and information relevant to the destination. The baggage data may include information relevant to a size of the baggage and information relevant to a weight of the baggage. Process 900 may proceed from 910 to 920.

At 920, process 900 may involve the first processor accessing a database (e.g., database 130 or 230) storing capacity data of the fleet of vehicles (e.g., capacity data 133 or 233). The fleet of vehicles may include a plurality of vehicles (e.g., fleet 140 includes vehicles 140(1)-140(N), and fleet 240 includes vehicles 240(1)-240(N)). For each vehicle of the fleet of vehicles, the capacity data may record a loading situation of one or more baggage compartments of the respective vehicle (e.g., baggage compartments 451, 452, 453 and 454 shown in FIG. 4). Each of the baggage compartments may have a size capacity and a weight capacity. In some embodiments, the information relevant to the size of the baggage may include a measured dimension of the baggage or an image of the baggage (e.g., image 023 of FIG. 3). In some embodiments, the information relevant to the weight of the baggage may include a measured weight of the baggage or an estimated weight of the baggage. Process 900 may proceed from 920 to 930. Specifically, process 900 may proceed from 920 to 932.

At 930, process 900 may involve the first processor selecting a vehicle of the fleet of vehicles based on the transportation request and the capacity data. Specifically, at 932, process 900 may involve the first processor comparing the baggage data with the capacity data to determine whether a baggage compartment of the vehicle is available to accommodate the baggage. In an event that one or more baggage compartments are available, process 900 may proceed from 932 to 934. In an event that the baggage compartment is not available process 900 may proceed from 932 to 936.

At 934, process 900 may involve the first processor selecting a vehicle of the fleet which has a baggage compartment determined available for transporting the baggage. Process 900 may proceed from 934 to 940.

At 936, process 900 may involve the first processor sending a repackaging suggestion to the second processor. The repackaging suggestion may include a suggestion to repackage the baggage into a few smaller or lighter packages. Process 900 may proceed from 936 to 938.

At 938, process 900 may involve the first processor receiving a modified baggage data from the second processor. The modified baggage data may include size and weight of the smaller or lighter packages. Process 900 may proceed from 938 to 932.

At 940, process 900 may involve the vehicle verifying baggage weight and size at the pickup location before receiving the baggage. Specifically, at 940, process 900 may involve the vehicle, after arriving at the pickup location, determining an estimated size of the baggage and obtaining a measured weight of the baggage. In some embodiments, the vehicle may determine the estimated size of the baggage based on an image of the baggage generated by a camera on the vehicle (e.g., camera 720 of FIG. 7). In some embodiments, the vehicle may determine the estimated size of the baggage based on a 3D scan of the baggage generated by a 3D scanner on the vehicle (e.g., 3D scanner 720 of FIG. 7). In some embodiments, the vehicle may obtain the measured weight by a weight scale on the vehicle (e.g., weight scale 710 of FIG. 7). At 940, process 900 may also involve the vehicle verifying that the estimated size is within a size tolerance from the size of the baggage indicated by the baggage data. At 940, process 900 may further involve the vehicle verifying that the measured weight is within a weight tolerance from the weight of the baggage indicated by the baggage data. In an event that both the weight and the size of the baggage are verified to be matched or close within the weight tolerance and the size tolerance to what are indicated by the baggage data, process 900 may proceed from 940 to 950. In an event that either the weight or the size of the baggage is not matched or close within the weight or size tolerance to what are indicated by the baggage data, process 900 may proceed from 940 to 944.

At 944, process 900 may involve the vehicle notifying the first processor of the estimated size and the measured weight that are determined or otherwise obtained at 940. At 944, process 900 may also involve the first processor updating the baggage data with the estimated size and the measured weight. Process 900 may proceed from 944 to 920 and subsequently proceed to 930. The first processor, with the updated baggage data, may select a different baggage compartment, either of the vehicle or of a different vehicle of the fleet, to accommodate the baggage.

At 950, process 900 may involve the vehicle securing the baggage, the passenger, or both, to the vehicle at the pickup location. For example, the vehicle may lock the baggage compartment after the baggage have been loaded into the baggage compartment. Process 900 may proceed from 950 to 960.

At 960, process 900 may involve the vehicle transporting the baggage, the passenger, or both, from the pickup location to the destination. Process 900 may proceed from 960 to 970.

At 970, process 900 may involve vehicle releasing the baggage, the passenger, or both, from the vehicle at the destination. In some embodiments, the baggage may be picked up by a recipient at the destination. The first processor may send a notification to the recipient, upon arriving the destination, or shortly before or after arriving the destination, to indicate the baggage has or about to arrive at the destination. A credential of the recipient may be verified before the vehicle releases the baggage to the recipient. The baggage data would include the credential of the recipient to verify against, such as a name or a confirmation code. When both the vehicle and the recipient are present at the destination, process 900 may involve the vehicle receiving from the recipient a verification of the credential of the recipient, such as a valid identification document or driver's license of the recipient. The vehicle may then provide an access to the baggage for the recipient to unload the baggage from the vehicle.

Figure 10:
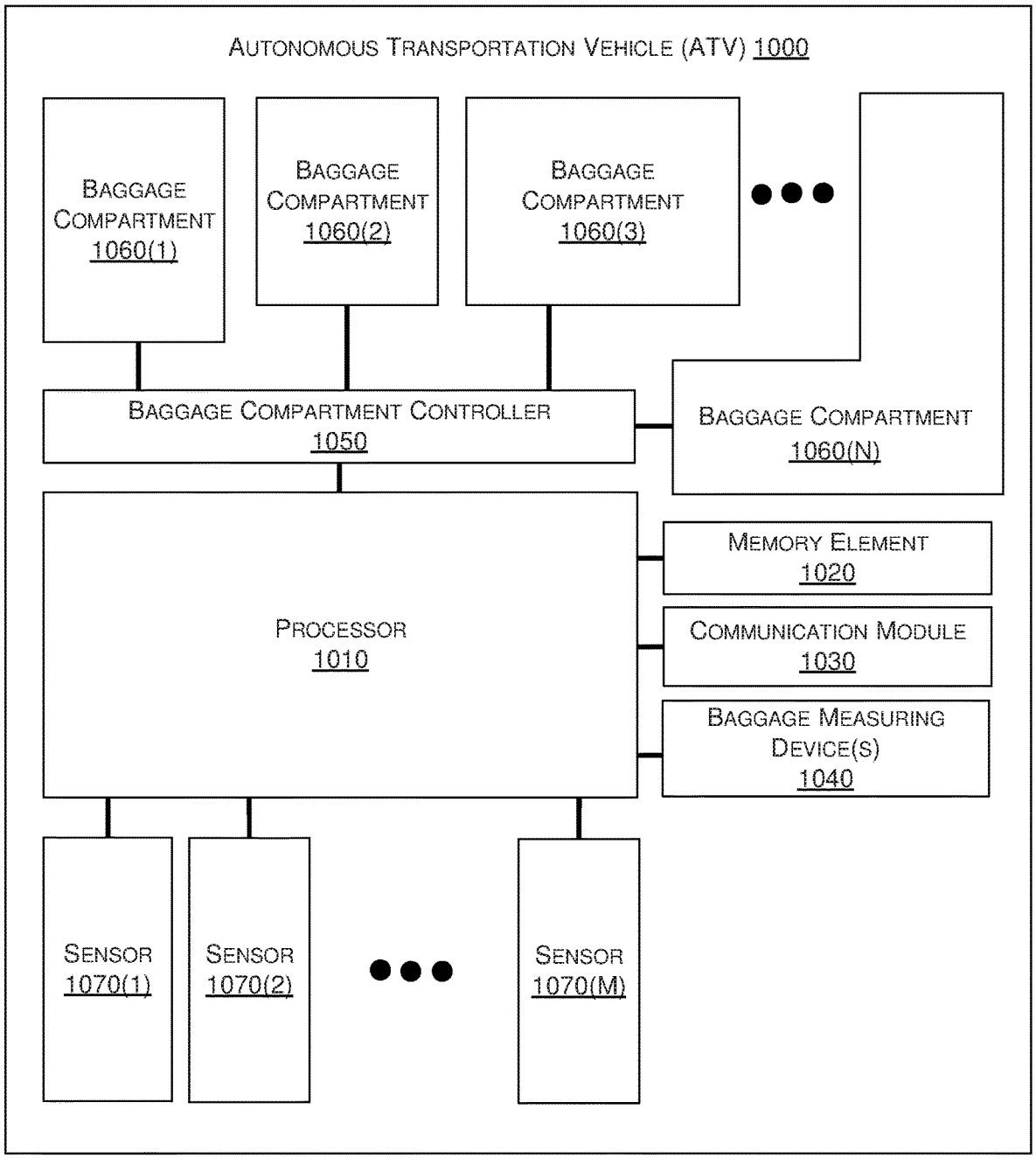
FIG. 10 is a block diagram depicting an example transportation vehicle in accordance with an embodiment of the present disclosure.

FIG. 10 illustrates an example block diagram of an autonomous transportation vehicle (ATV) 1000. ATV 1000 may be used as one of vehicles 140(1)-140(N) of fleet 140 in scenario 100 of FIG. 1, or one of vehicles 240(1)-240(N) of fleet 240 in scenario 200 of FIG. 2, to perform a transportation service. That is, ATV 1000 may be used by a baggage transportation system in any of processes 500, 600, 800 and 900 described above to transport a baggage from a pickup location to a destination.

As shown in FIG. 10, ATV 1000 may include a computer or a processor 1010, such as any of distributed processors 210(1)-210(N) of FIG. 2. In addition, ATV 1000 may include a plurality of baggage compartments 1060 (1), 1060(2), 1060(3), . . . , 1060(N). Each of baggage compartments 1060(1)-1060(N) may respectively have a size capacity (i.e., a maximum allowable size of baggage the baggage compartment can carry) and a weight capacity (i.e., a maximum allowable weight of baggage the baggage compartment can carry). ATV 1000 may also include a plurality of sensors 1070 (1), 1070(2), 1070(3), . . . , 1070(M) communicatively coupled to processor 1010. The plurality of sensors 1070 (1)-1070(M) may be disposed inside or in a proximity of baggage compartments 1060(1)-1060(N), such as sensors 461-466 disposed in baggage space 400 at locations close to baggage compartments 451-454 as shown in FIG. 4. Sensors 1070 (1)-1070(M) may include a pressure sensor, a proximity sensor, a light detector, a visible light camera or an infrared camera. Sensors 1070 (1) 1070(M) may be used to monitor a loading situation of baggage compartments 1060(1)-1060(N). That is, through sensors 1070 (1)-1070(M), ATV 1000 may keep track of which of baggage compartments 1060(1)-1060(N) are being used, and which of baggage compartments 1060(1)-1060(N) are available.

ATV 1000 may also include a memory element 1020 capable of storing a capacity data that represents the loading situation of baggage compartments 1060(1)-1060(N). For example, if ATV 1000 is vehicle 240(1) of FIG. 2, then memory element 1020 is memory element 230(1), storing capacity data 233(1). Processor 1010 may update the capacity data stored in memory element in an event that the loading situation of baggage compartments 1060(1)-1060(N) is changed due to a baggage having been loaded to, or unloaded from, any of baggage compartments 1060(1)-1060(N).

In some embodiments, ATV 1000 may also include a communication module 1030 for data communication between ATV 1000 and another entity, which may be another computer or processor (e.g., centralized server 110, a distributed processor of another vehicle of the fleet such as 230(2), smartphone 020), DCN 280, database 130, or a recipient of the baggage. Communication module 1030 may be used to receive a transportation request, such as transportation request 090 of FIG. 1 or FIG. 2. The transportation request may include baggage data (e.g., baggage data 093 of FIG. 1) that contains information relevant to a size of the baggage and information relevant to a weight of the baggage.

Based on the baggage data received by communication module 1030 as part of the transportation request, as well as the capacity data stored in memory element 1020, processor 1010 may determine whether the vehicle is able to accommodate the transportation request. In an event that processor 1010 determines that ATV 1000 is able to accommodate the transportation request, communication module 1030 may send a notification indicating an availability of ATV 1000 to accommodate the transportation request. In an event that processor 1010 determines that ATV 1000 is not able to accommodate the transportation request, communication module 1030 may send a repackaging suggestion that contains a suggestion how the baggage may be repackaged into a plurality of packages that may be smaller, lighter or both, than the baggage.

In some embodiments, ATV 1000 may also include one or more baggage measuring devices 1040 for measuring the size and/or weight of the baggage at the pickup location. Measuring device 1040 may be weight scale 710 or camera or 3D scanner 720 of FIG. 7, or a device having both 710 and 720 integrated as one. Processor 1010 may verify that the size and the weight of the baggage as measured by baggage measuring device 1040 are within a predetermined tolerance from the size and the weight of the baggage as indicated by the baggage data, and then unlocks, through a baggage compartment controller 1050, at least one of baggage compartments 1060(1)-1060(N) to provide an access to the at least one baggage compartment for loading the baggage thereto.

In some embodiments, communication device 1030 may send an arrival notification to a recipient of the baggage either after or within a predetermined time before ATV 1000 arrives at the destination. The arrival notification may indicate an arrival of the baggage at the destination. In some embodiments, the baggage data received by ATV 1000 may contain a credential of the recipient of the baggage. ATV 1000 may verify the credential when the recipient present at the destination, and having successfully verified the credential, ATV 1000 may unlock one or more of the baggage compartments 1060(1)-1060(N) through baggage compartment controller 1050 for the recipient to unload the baggage.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:

generating at least one of an image of a baggage and a three-dimensional (3D) scan of the baggage, wherein the image is generated by a camera and the 3D scan is generated by a 3D scanner;

receiving, by a first processor from a second processor, a transportation request, wherein the first processor is included within a network of distributed processors each disposed in a respective vehicle of a fleet of vehicles comprising a plurality of vehicles and communicatively coupled to the second processor, wherein the transportation request comprises itinerary data and baggage data relevant to transporting a baggage, a passenger, or both, from a pickup location to a destination, wherein the itinerary data comprises information relevant to the pickup location and information relevant to the destination, wherein the baggage data comprises information relevant to a size of the baggage and information relevant to a weight of the baggage, wherein the information relevant to the size of the baggage comprises a measured dimension of the baggage and at least one of the image of the baggage generated by the camera and the 3D scan of the baggage generated by the 3D scanner, and wherein the information relevant to the weight of the baggage comprises a measured weight of the baggage or an estimated weight of the baggage;

accessing, by the first processor, a database storing capacity data of the fleet of vehicles, wherein the database comprises a distributed database comprising a network of memory elements each disposed in the respective vehicle of the fleet of vehicles, wherein the capacity data records, for each vehicle of the fleet of vehicles, a loading situation of one or more baggage compartments of the respective vehicle, each of the one or more baggage compartments respectively having a size capacity and a weight capacity, wherein the loading situation comprises a baggage space of the one or more baggage compartments of the respective vehicle, the baggage space being at least one of virtually divisible or combinable by a virtual adjustment and physically divisible by use of one or more physical dividers such that the baggage space is divisible or combinable into the one or more baggage compartments of the respective vehicle, and wherein the respective vehicle is capable of updating the capacity data of the respective vehicle in a real-time manner;

selecting, by the first processor, a vehicle of the fleet of vehicles based on the transportation request and the capacity data, wherein the capacity data comprises a positive size tolerance, a negative size tolerance, a positive weight tolerance, and a negative weight tolerance; and performing, by the vehicle, a transportation service that fulfills the transportation request, wherein performing the transportation service that fulfills the transportation request comprises:

unlocking a baggage compartment based on:
determining, by the vehicle, an estimated size of the baggage based on the image of the baggage or the three-dimensional (3D) scan of the baggage;
obtaining the measured weight of the baggage by a weight scale on the vehicle;

verifying that the estimated size is within the positive size tolerance and the negative size tolerance from the size of the baggage indicated by the baggage data; and verifying that the measured weight is within the positive weight tolerance and the negative weight tolerance from the weight of the baggage indicated by the baggage data;

securing, by the vehicle, the baggage, the passenger, or both, to the vehicle at the pickup location;

transporting, by the vehicle, the baggage, the passenger, or both, from the pickup location to the destination; and releasing, by the vehicle, the baggage, the passenger, or both, from the vehicle at the destination.

2. The method of claim 1, wherein:

the first processor further comprises a centralized server communicatively coupled to the second processor, the database further comprises a centralized database, and each vehicle of the fleet of vehicles is communicatively coupled to the database and capable of updating the capacity data of the respective vehicle in a real-time manner.

3. The method of claim 1, wherein the selecting of the vehicle comprises comparing the baggage data with the capacity data to determine whether one of the one or more baggage compartments of the vehicle is available to accommodate the baggage.

4. The method of claim 3, wherein, in an event that the one of the one or more baggage compartments is determined not available, the selecting of the vehicle further comprises:

sending, by the first processor to the second processor, a repackaging suggestion comprising a suggestion to repackage the baggage into a plurality of packages each smaller, lighter, or both, than the baggage if no vehicle of the fleet of vehicles is currently available to accommodate the baggage;

receiving, by the first processor from the second processor, a modified baggage data comprising information relevant to the plurality of packages; and comparing, by the first processor, the modified baggage data with the capacity data to determine whether one or more baggage compartments of the vehicle are available to accommodate the plurality of packages.

5. The method of claim 1, wherein the baggage data further comprises a credential of a recipient of the baggage, and wherein the releasing of the baggage comprises:

sending, by the first processor, a notification to the recipient, the notification indicating an arrival of the baggage at the destination;

receiving, by the vehicle from the recipient, a verification of the credential of the recipient while both the vehicle and the recipient are at the destination; and providing, by the vehicle, an access to the baggage for the recipient to unload the baggage from the vehicle.

6. A vehicle, comprising:

a plurality of baggage compartments each respectively having a size capacity and a weight capacity, wherein the size capacity comprises a positive size tolerance and a negative size tolerance, and wherein the weight capacity comprises a positive weight tolerance and a negative weight tolerance;

a plurality of sensors capable of autonomously monitoring a loading situation of the plurality of baggage compartments, wherein the loading situation comprises a baggage space of the plurality of baggage compartments, the baggage space being at least one of virtually divisible or combinable by a virtual adjustment and physically divisible by use of one or more physical dividers such that the baggage space is divisible or combinable across the plurality of baggage compartments;

a memory element capable of storing capacity data generated in response to the autonomous monitoring by the plurality of sensors and representing the loading situation;

a communication module capable of receiving a transportation request for transporting a baggage from a pickup location to a destination, wherein the transportation request comprises baggage data comprising information relevant to a size of a baggage and information relevant to a weight of the baggage;

a baggage measuring device capable of measuring the size of the baggage and the weight of the baggage at the pickup location, wherein the baggage measuring device comprises a camera on the vehicle and a three-dimensional (3D) scanner on the vehicle; and a processor capable of updating the capacity data, responsive to the autonomous monitoring by the plurality of sensors, in an event that the loading situation is changed due to the baggage having been loaded to, or unloaded from, a respective baggage compartment of the plurality of baggage compartments, wherein the processor is further capable of determining, based on the baggage data received by the communication module and the capacity data stored in the memory element, whether the vehicle is able to accommodate the transportation request either with or without dividing or combining the baggage space across the plurality of baggage compartments, wherein, after the processor verifies that the size of the baggage, as measured by the baggage measuring device, is within the positive size tolerance and the negative size tolerance as indicated by the baggage data and that the weight of the baggage, as measured by the baggage measuring device, is within the positive weight tolerance and the negative weight tolerance as indicated by the baggage data, at least one baggage compartment of the plurality of baggage compartments unlocks to provide an access to the at least one baggage compartment for the baggage to be loaded into the at least one baggage compartment based at least in part on the determination that the vehicle is able to accommodate the transportation request either with or without dividing or combining the baggage space across the plurality of baggage compartments, wherein, responsive to the determination that the vehicle is able to accommodate the transportation request either with or without dividing or combining the baggage space across the plurality of baggage compartments, the vehicle is configured to fulfill the transportation request by:

unlocking a baggage compartment based on:

determining, by the vehicle, an estimated size of the baggage based on the image of the baggage or the three-dimensional (3D) scan of the baggage;

obtaining the measured weight of the baggage by a weight scale on the vehicle;

verifying that the estimated size is within the positive size tolerance and the negative size tolerance from the size of the baggage indicated by the baggage data; and verifying that the measured weight is within the positive weight tolerance and the negative weight tolerance from the weight of the baggage indicated by the baggage data;

securing, by the vehicle, the baggage to the vehicle at the pickup location;

transporting, by the vehicle, the baggage from the pickup location to the destination; and releasing, by the vehicle, the baggage from the vehicle at the destination, and wherein, in an event that the processor determines that the vehicle is not able to accommodate the transportation request, the communication module is further capable of sending a repackaging suggestion comprising a suggestion to repackage the baggage into a plurality of packages each smaller, lighter, or both, than the baggage responsive to the determination that the vehicle is not able to accommodate the transportation request.

7. The vehicle of claim 6, wherein the plurality of sensors comprises one or more of a pressure sensor, a proximity sensor, a light detector, a visible light camera, and an infrared camera.

8. The vehicle of claim 6, wherein, in an event that the processor determines that the vehicle is able to accommodate the transportation request, the communication module is further capable of sending a notification indicating an availability of the vehicle to accommodate the transportation request.

9. The vehicle of claim 6, wherein the communication module is further capable of sending a notification to a recipient of the baggage after the vehicle arrives at the destination with the baggage or within a predetermined time before the vehicle arrives at the destination, the notification indicating an arrival of the baggage at the destination.

10. The vehicle of claim 6, wherein the baggage data further comprises a credential of a recipient of the baggage, and wherein at least one of the plurality of baggage compartments is unlocked for the recipient to unload the baggage after the vehicle verifies the credential of the recipient at the destination.

11. The vehicle of claim 6, wherein the vehicle is an autonomous vehicle.

* * * * *